United States Patent [19]
Umphrey

[11] 3,921,534
[45] Nov. 25, 1975

[54] TURN GUIDE APPARATUS WITH ROLLER MEANS

[75] Inventor: Ronald W. Umphrey, Ponca City, Okla.

[73] Assignee: Continental Oil Company, Ponca City, Okla.

[22] Filed: Apr. 15, 1974

[21] Appl. No.: 460,861

[52] U.S. Cl. ............................................. 104/247
[51] Int. Cl.² ........................................... B61F 9/00
[58] Field of Search ........ 104/242, 244, 244.1, 245, 104/246, 247, 248, 139, 140, 135; 193/35 R; 254/190 R; 180/79, 79.3, 79.4, 79.5

[56] References Cited
UNITED STATES PATENTS

| | | | |
|---|---|---|---|
| 2,926,001 | 2/1960 | Mack et al. | 254/190 R |
| 3,268,099 | 8/1966 | Ajero et al. | 193/35 R X |
| 3,595,377 | 7/1971 | McCoy et al. | 104/135 X |
| 3,802,354 | 4/1974 | Bateson et al. | 104/246 X |

*Primary Examiner*—M. Henson Wood, Jr.
*Assistant Examiner*—Randolph A. Reese
*Attorney, Agent, or Firm*—Richard W. Collins

[57] ABSTRACT

An apparatus and process is provided for controlling the path of a train through a turn, the turn guide apparatus comprises a portable base having vertical support rollers and side rollers to lift and conduct the position of box channel segments of the train thereby controlling the path of the train through a turn of up to about 90°.

11 Claims, 11 Drawing Figures

3,921,534

TURN GUIDE APPARATUS WITH ROLLER MEANS

BACKGROUND OF THE INVENTION

The invention of this application relates to an apparatus and a process for controlling the path of a train comprising a series of pivotally connected linkage segment means or channel members. This train can serve to support and transport any standard apparatus such as a conveyor along a given path. This invention is particularly applicable to an apparatus with a hydraulic or slurry conveying system as described in related applications U.S. Ser. Nos. 297,113, filed Oct. 12, 1972 now abandoned; 389,271, filed Aug. 21, 1973 now U.S. Pat. No. 3,868,964; and 389,273, filed Aug. 21, 1973 now abandoned.

SUMMARY OF THE INVENTION

The apparatus of this invention is a turn guide apparatus for controlling the path of a movable steerable train comprising a series of pivotally connected linkage segment means, said guide comprising a base means having a side roller means with at least one roller adapted to rotatably engage and transmit forces to said linkage segment means and a vertical support roller means having at least one roller adapted to rotatably engage and transmit forces to said linkage segment means, said base means being attached to a support means for removably maintaining said guide means at a predetermined height relative to a foundation means to permit engagement of said guide means with said linkage segment means. The turn guide at the base means or support means is optionally hinged to make the turn guide means removable and to permit attaching the turn guide to the linkage segment means for carrying or storing the turn guide when it is not fixed in place on the foundation means to engage and control the path of the linkage segment means. The turn guide is optionally attached to the linkage segment means by hanger means which can be removable as shown in FIG. 6 or part of the structure as shown in FIGS. 3 and 4.

This invention also provides a process for controlling the path of a train of pivotally connected linkage segment lengths as described herein using the particular turn guide apparatus as described herein wherein a portion of the linkage segment means is rotatably engaged by the side rollers of said turn guide apparatus which is anchored to a foundation means. The turn guide apparatus exerts lateral forces on said linkage segment means through said roller means to deflect said linkage segment means through an angle to maintain a fixed, curved path for said linkage segment means and then disengaging said portion of said linkage means. A preferred process involves the engagement of both side roller means to exert lateral forces and vertical roller means to exert vertical forces on said linkage segment means so that the train or series of linkage segment means with support means is lifted free of the foundation means or floor and is in absolute control by said turn guide means.

BRIEF DESCRIPTION OF THE DRAWINGS

The turn guide apparatus of this invention and its function are illustrated by FIGS. 1 through 11 of the drawings.

DESCRIPTION OF THE PREFERRED EMBODIMENTS

Figure 1:
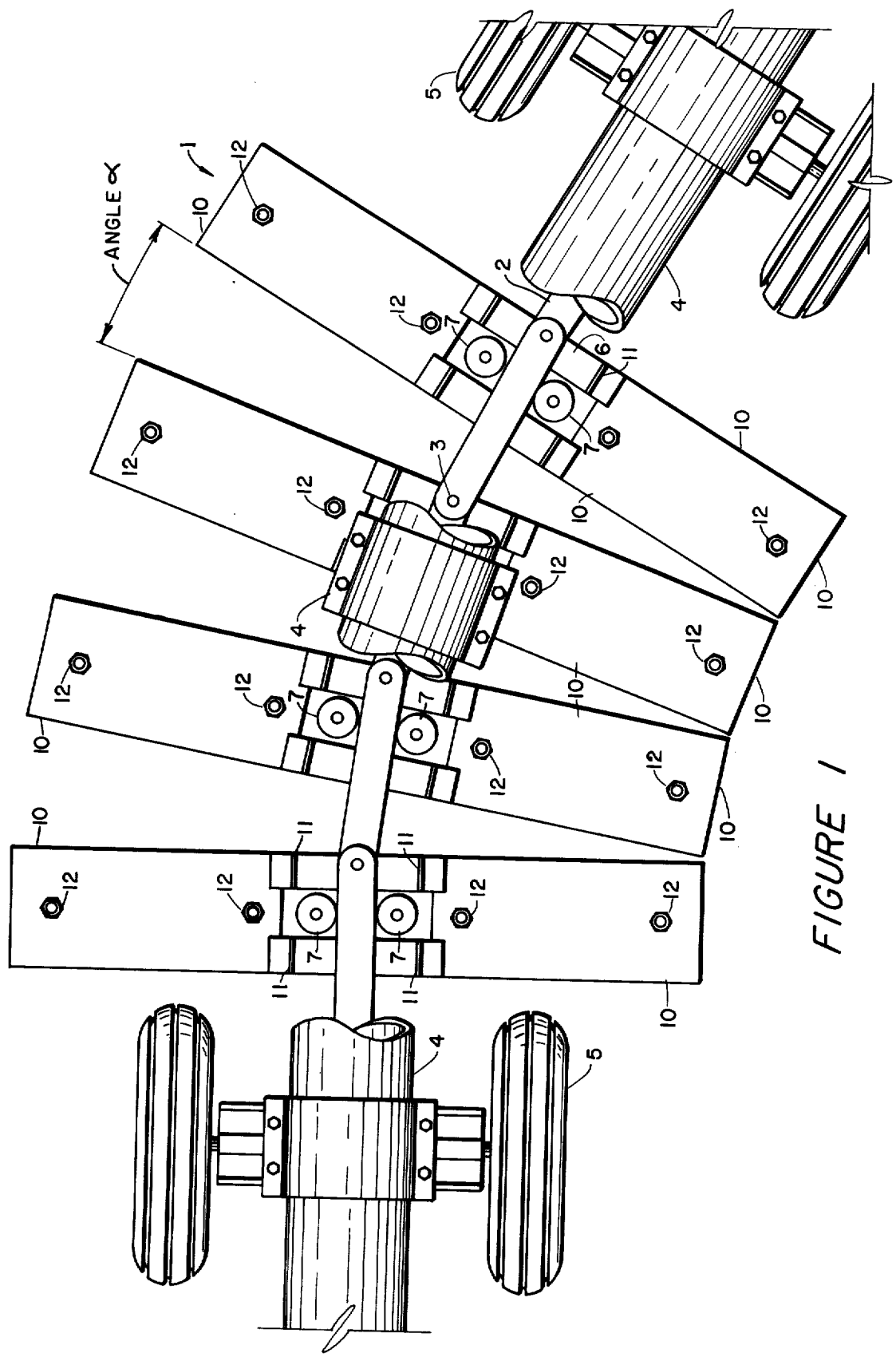
FIG. 1 is a top view with cut-away portions showing a segment train and the relationship of hydraulic conveying hoses as the train passes over four individual turn guides arranged in a curved path.
Figure 2:
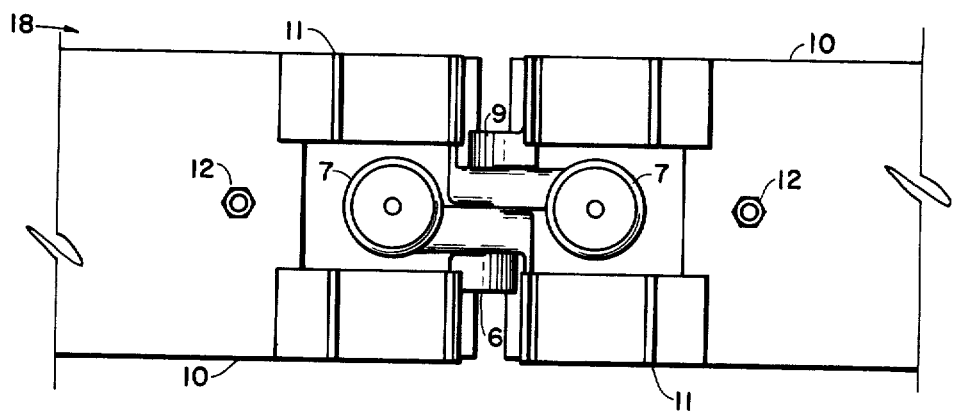
FIG. 2 is a top view of one embodiment of the turn guide apparatus of this invention with side rollers.
Figure 3:
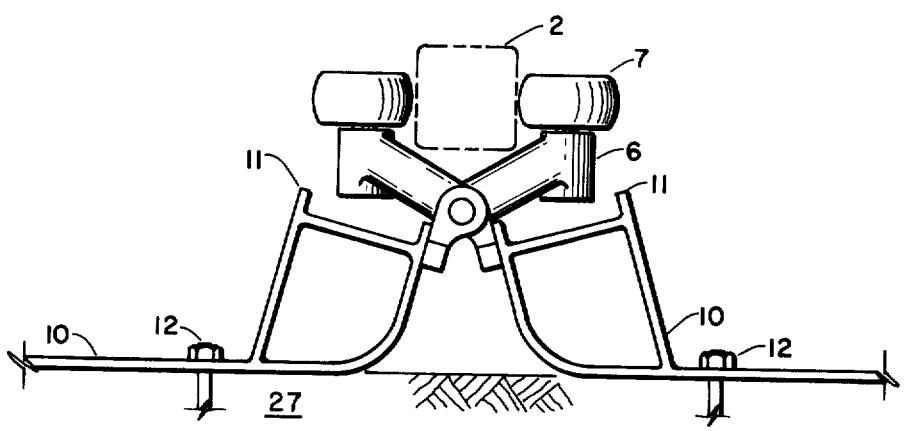
FIG. 3 is a side view of the turn guide apparatus of FIG. 2 showing the relation of the pivotally linked box channel segment means of the train.
Figure 4:
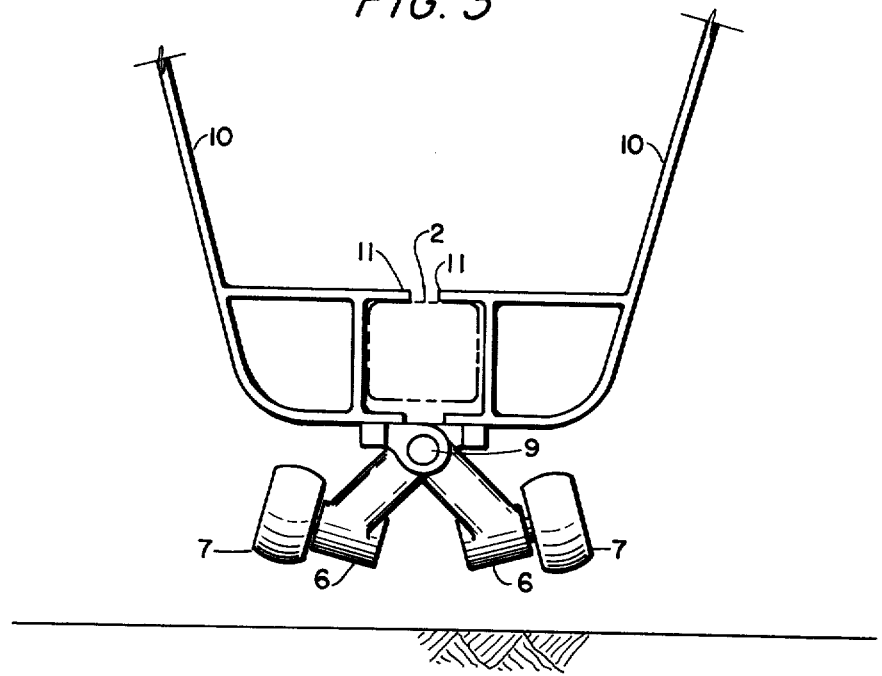
FIG. 4 is a side view of the apparatus of FIG. 2 showing the apparatus in a carry position attached to and supported by the box channel linkage segment means.

The turn guide apparatus and one embodiment thereof can be understood by reference to the drawings. FIG. 1 shows a top view of a train of linkage segment means 2 carrying hydraulic conveyor means 4 supported by two-wheel cart support means 5 comprising pneumatic tires which rotate independently and are attached to the linkage segment means by a horizontal cross axle. Four independent turn guides such as 1 are shown disposed in a series forming a curved path. The linkage segment means are engaged by side roller means 7 which control the path of the linkage segment means and therefore the train. The turn guide as shown in FIG. 1 is also shown as 18 in FIG. 2. As shown in FIGS. 2 and 3, side roller means 7 engaging linkage segment means 2 are mounted on base means 6 in opposed relationship to the linkage segment means. The base means is hinged by hinge means 9 so that it can be folded to the position shown in FIG. 4 with the support means 10 in an upward position and the hanger means 11 holding the turn guide onto the linkage segment means. In FIG. 3, the support means 10 is resting on foundation means 27 and anchored thereto by anchor means 12 so that the path of the train or linkage segment means is controlled relative to said foundation means.

Figure 5:
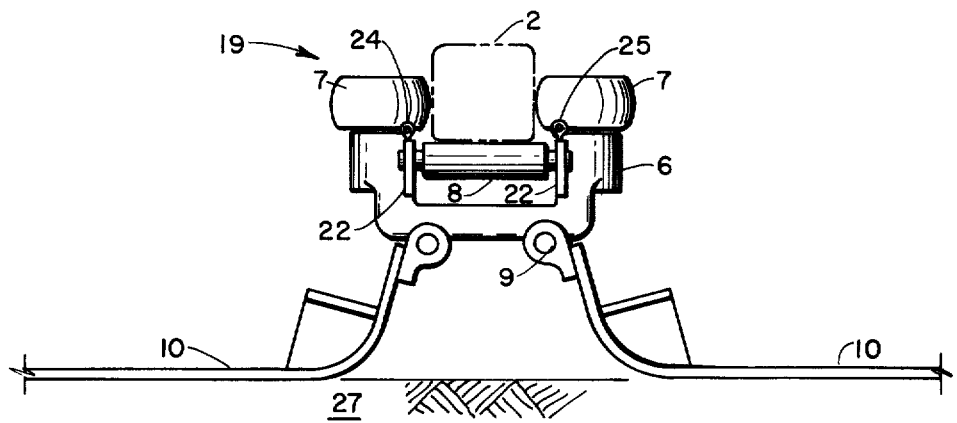
FIG. 5 is a side view of another embodiment of the turn guide apparatus of this invention showing both side roller means and vertical support roller means with the apparatus in the use position supporting and controlling the path of the box channel segment members of the train.
Figure 6:
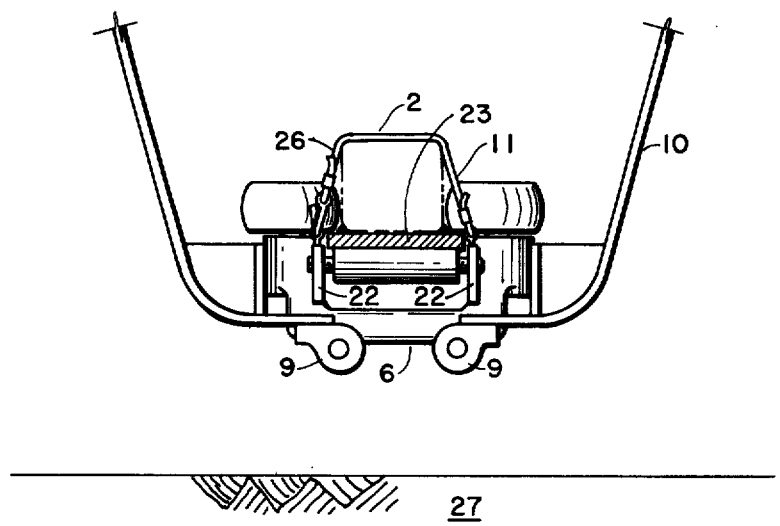
FIG. 6 is a side view of the turn guide apparatus of FIG. 5 showing the apparatus in the carry position supported by a channel segment member of the train.

The embodiment 19 shown in FIGS. 5 and 6 is another variation of the turn guide apparatus of this invention. The base means 6 and side roller means 7 and other features are substantially the same as for other embodiments. The base means 6 is not hinged but rather the support means 10 is pivotally connected to the base means or hinged thereto by hinge means 9. The turn guide of FIG. 5 carries an optional vertical support roller 8 attached to the base means by adjustable tabs 22 so that the linkage segment means can be engaged by the vertical support roller and the train can be lifted clear of the foundation means 27. The apparatus of FIG. 5 has hook means 24 and 25 for attaching a removable hanger means or strap means 26 in FIG. 6 for carrying the turn guide in the carry position as shown. FIG. 6 also shows a plate means 23 attached to the linkage segment means 2 which serves as a bearing surface for the vertical support roller means 8 and can serve to support the turn guide by the overlapping side roller means 7. The plate means also serves to maintain the turn guide in engagement with the linkage segment means.

Figure 7:
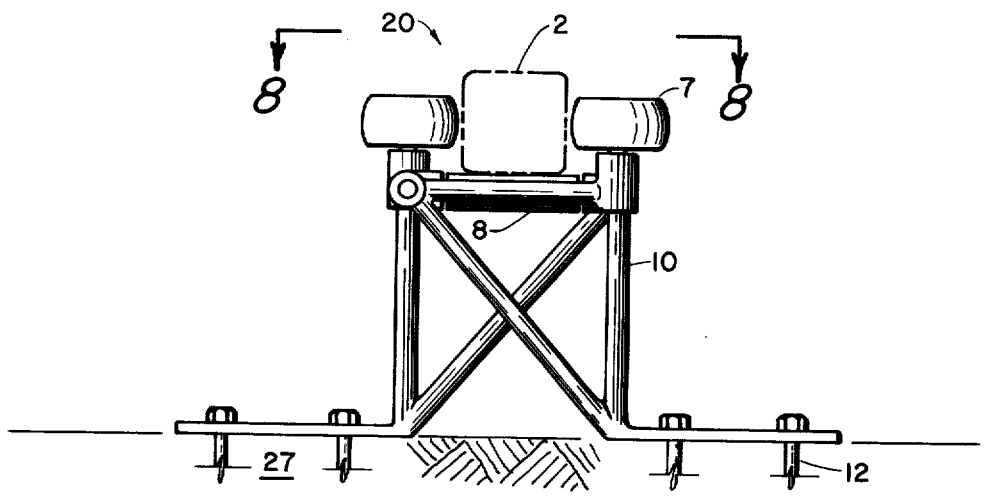
FIG. 7 shows another embodiment of the turn guide apparatus of this invention with the vertical support roller on a double-hinged arm so that the apparatus can be folded for the use position as shown in FIG. 7 controlling the path of box channel segment means.
Figure 8:
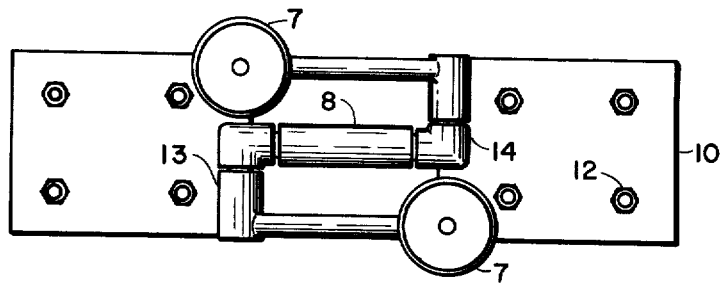
FIG. 8 is a top view of the apparatus of FIG. 7.
Figure 9:
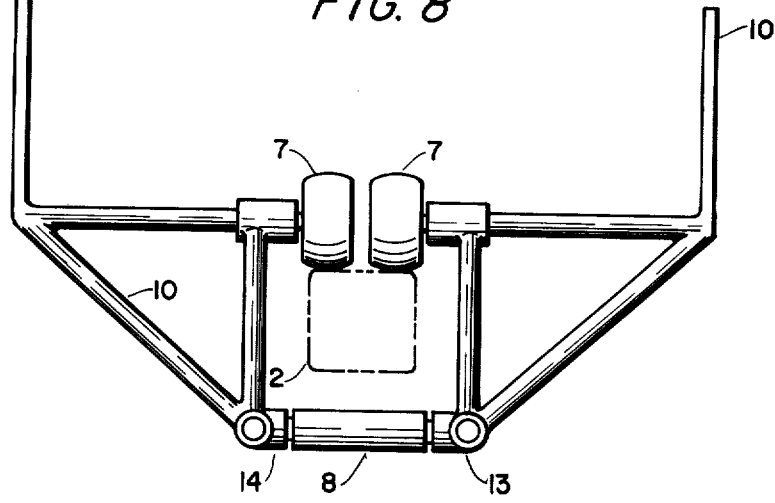
FIG. 9 is a side view showing the apparatus of FIGS. 7 and 8 in the carry position with the side roller means resting on top of the box channel segment means.

Embodiment 20 of the turn guide of this invention shown in FIGS. 7, 8, and 9 is another variation with the side roller means 7 substantially the same as in the previous embodiments. The side roller means are in opposed engagement with the linkage segment means 2. The vertical support roller means 8 is mounted on a double-hinged arm which is hinged at points 13 and 14. It reverses itself from the use position shown in FIGS. 7 and 8 to the carry position shown in FIG. 9 where the side roller means rest atop the linkage segment means and serve to support the turn guide on the linkage segment means. It can be stored or transported in this position.

Figure 10:
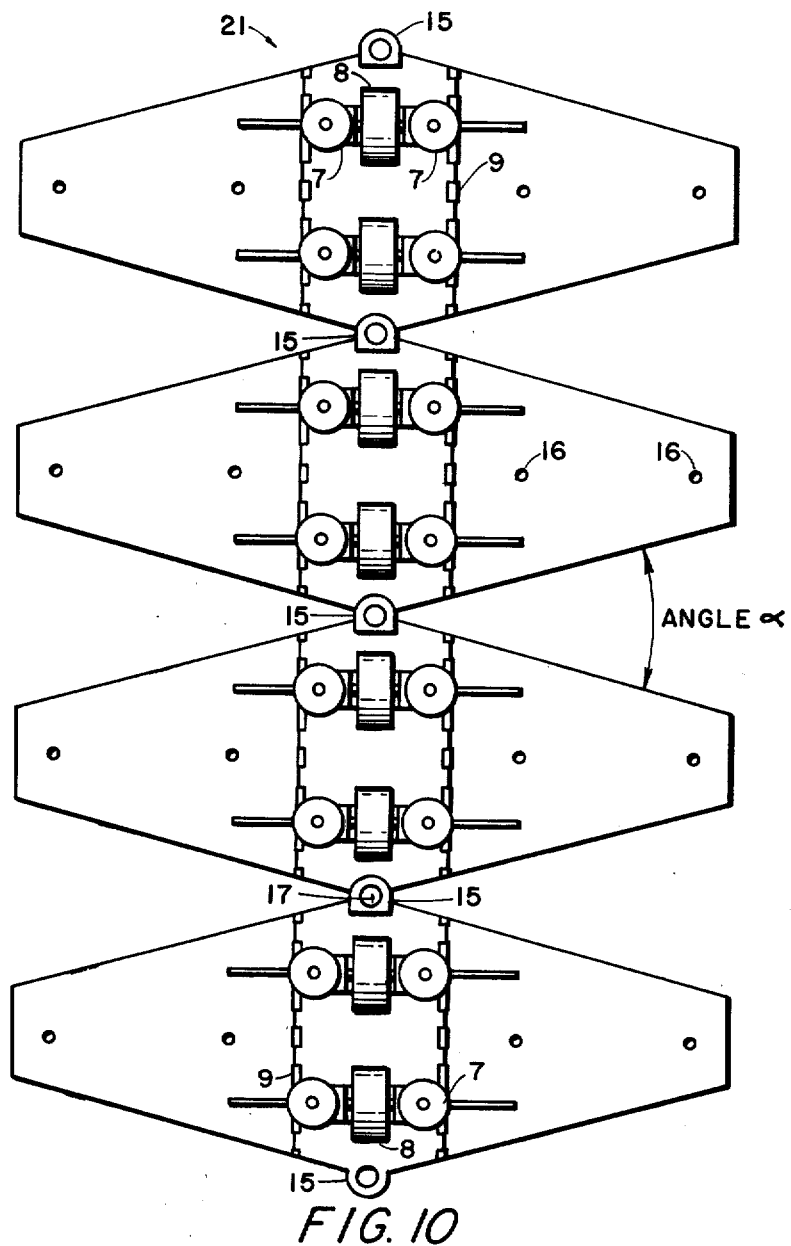
FIG. 10 is a top view of another embodiment of the apparatus of this invention showing a series of four turn guides pivotally connected to each other. Each turn guide has two sets of rollers with two side roller means and a vertical support roller means in each set mounted on a base means.
Figure 11:
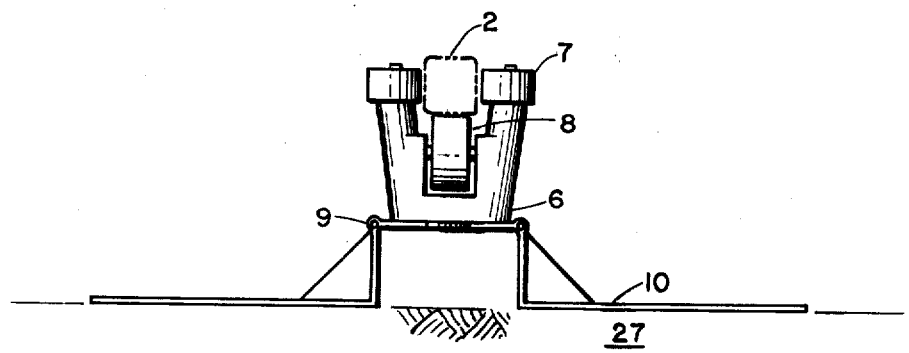
FIG. 11 is a side view of the turn guides of FIG. 10 showing the relation of the box channel of the train as it is supported and controlled by the turn guide.

Embodiment 21 of the turn guide of this invention as shown in FIGS. 10 and 11 is a series of four turn guides pivotally connected by pivot means 15 and by a pin means 17. The support means 10 folds or hinges at hinge means 9 so that the turn guide can be removably fixed or elevated relative to foundation means 27 to engage the linkage segment means 2. Each turn guide carries two sets of roller means 7 and 8 on a base means 6. Each set of roller means for each embodiment of the apparatus of this invention preferably has two to four side roller means, and when present at least one vertical support roller means. At least two of the side roller means should be in opposed relationship or on opposite sides of the linkage segment means to exert lateral forces on both sides of the linkage segment means. The support means has hole means 16 for moving the turn guides relative to each other by any conventional means (not shown) such as a hydraulic cylinder system or any mechanical moving mechanism. This moving mechanism can be permanently or removably fixed to adjacent turn guides at the support means or at the base means. The support means are beveled at an angle α relative to each other so that the turn guide segments can be disposed in a curved path of up to about 90° and thereby control the path of the train or linkage segments through this angle.

I claim:

1. A turn guide apparatus for controlling the path of a movable, steerable train of pivotally connected linkage segment means said guide comprising a base means having at least one side roller means adapted to rotatably engage said linkage segment means and apply lateral forces to said linkage segment means, said base means being attached to a support means adapted to removably maintain said base means with said side roller means at a given height above a foundation means to engage said linkage segment means, said turn guide apparatus being hinged to permit disengagement of said turn guide apparatus from said linkage segment means.

2. A turn guide apparatus of claim 1 for controlling the path of a train of pivotally connected linkage segment means, said guide comprising a base means hving a side roller means comprising at least one roller adapted to rotatably engage said linkage segment means and transmit lateral forces to said linkage segment means, said base means being attached to a support means adapted to removably maintain said turn guide apparatus a given height above a foundation means to permit engagement of said turn guide apparatus with said linkage segment means, said base means having a vertical support roller means to rotatably engage said linkage segment means and apply vertical forces to said linkage segment means, said turn guide apparatus being hinged to permit disengagement of said turn guide apparatus from said linkage segment means.

3. A turn guide apparatus of claim 2 for controlling the path of a movable steerable train of pivotally connected linkage segment means, said guide comprising a base means having a side roller means comprising at least one roller adapted to rotatably engage said linkage segment means and transmit lateral forces to said linkage segment means and a vertical support roller meams comprising at least one roller adapted to rotatably engage and transmit vertical forces to said linkage segment means, said vertical support roller means being attached to said base means by adjustable tab means, said base means being attached to a support means adapted to removably maintain said base means at a given height above a foundation means and permit engagement of said side roller means and vertical support roller means with said linkage segment means, said turn guide apparatus being hinged to permit disengagement of said turn guide apparatus from said linkage segment means.

4. A turn guide apparatus of claim 2 for controlling the path of a movable steerable train of pivotally connected linkage segment means, said guide comprising a base means having a side roller means comprising at least one roller adapted to rotatably engage said linkage segment means and transmit lateral forces to said linkage segment means and a vertical support roller means comprising at least one roller adapted to rotatably engage said linkage segment means and transmit lateral forces to said linkage segment means, said base means being attached to a support means adapted to removably maintain said base means at a given height and permit engagement of said side roller means and said vertical support roller means with said linkage segment means, said turn guide apparatus being hinged by a double hinge arm means which carries the vertical support roller means and permits said base means to be folded into a carrying position so that said side roller means serve as a hanger means to support said turn guide apparatus on said linkage segment means.

5. A turn guide apparatus of claim 1 for controlling the path of a train of pivotally connected linkage segment means, said guide comprising a base means having a side roller means comprising at least one roller adapted to rotatably engage said linkage segment means and apply lateral forces to said linkage segment means and a vertical support roller means having at least one roller adapted to rotatably engage said linkage segment means and apply vertical forces to said linkage segment means, said base means being attached to a support means adapted to removably maintain said base means at a given height above a foundation means and permit engagement of said side roller means and vertical roller means with said linkage segment means, said turn guide apparatus being hinged to permit disengagement of said turn guide apparatus from said linkage segment means, said support means having a hanger means to engage said linkage segment means and support said turn guide apparatus on said linkage segment means when said side roller means and vertical support roller means are disengaged.

6. A turn guide apparatus of claim 1 for controlling the path of a train of pivotally connected linkage segment means, said guide comprising a base means having a side roller means comprising at least one roller adapted to rotatably engage said linkage segment means and transmit lateral forces to said linkage segment means and a vertical support roller means having at least one roller adapted to rotatably engage and transmit vertical forces to said linkage segment means, said base means attached to a support means adapted to removably maintain said base means at a given height above a foundation means to permit engagement of said side roller means and vertical support roller means with said linkage apparatus, said turn guide apparatus being hinged to permit disengagement of said turn guide apparatus from said linkage segment means, said support means having a hanger means adapted to engage said linkage segment means and support said turn guide apparatus when said side roller means and vertical roller means are disengaged, said hanger means being removably attached to said base means.

7. A turn guide apparatus of claim 1 for controlling the path of a movable steerable train of pivotally connected linkage segment means, said guide comprising a base means having two sets of roller means with each set of roller means having a side roller means comprising at least one roller adapted to rotatably engage and transmit lateral forces to said linkage segment means and a vertical support roller means comprising at least one roller adapted to rotatably engage and transmit vertical forces to said linkage segment means, said base means being hingeably connected to a support means adapted to removably maintain said base means at a predetermined height to permit engagement of said turn guide apparatus and said linkage segment means, and said support means adapted to rest upon a foundation means.

8. A turn guide apparatus of claim 1 for controlling the path of a movable steerable train of pivotally connected linkage segment means said guide comprising a base means having at least two sets of roller means comprising a side roller means of at least one roller adapted to rotatably engage and exert lateral forces on said linkage segment means and a vertical support roller means comprising at least one roller adapted to rotatably engage and exert vertical forces on said linkage segment means, said base means being attached to a support means adapted to removably maintain said guide apparatus at a predetermined height to permit engagement with said linkage segment means, said turn guide apparatus being pivotally connected to at least one other turn guide apparatus and disposed at an angle relative to each other to effect a turn of said linkage segment means of up to about 90°.

9. A turn guide apparatus of claim 8 for controlling the path of a movable steerable train of pivotally connected linkage segment means said guide comprising a hinged base means having at least two sets of roller means, each roller means comprising a side roller means having at least one roller adapted to rotatably engage and exert lateral forces on said linkage segment means and a vertical support roller means having at least one roller which is vertically adjustable for rotatably engaging and exerting vertical forces on said linkage segment means, said base means being attached to a support means to removably maintain said guide means at a predetermined height to engage said linkage segment means, said support means being pivotally connected to at least one other turn guide means, said support means having hole means therein disposed to permit the turn guide means to be disposed at an angle relative to each other to deflect said linkage segment means at an angle up to about 90°, and said hole means being adapted to permit anchoring said support means to a foundation means which supports said turn guide apparatus to permit said turn guide apparatus to deflect said linkage segment means through said angle relative to said foundation means.

10. A process for controlling the path of a train of pivotally connected linkage segment means by rotatably engaging a portion of said linkage segment means with a turn guide apparatus comprising a base means having a side roller means comprising at least one roller adapted to rotatably engage and exert lateral forces relative to a foundation means through a hinged support means adapted to removably support and permit engagement of said turn guide apparatus with said linkage segment means, exerting said lateral forces on said linkage segment means to deflect said linkage segment means through an angle of up to about 90°, controlling the path of said linkage segment means, and disengaging said portion of linkage segment means.

11. A process of claim 10 for controlling the path of a movable steerable train of pivotally connected linkage segment means bearing a conveying system comprising rotatably engaging a portion of said linkage segment means with a turn guide apparatus comprising a side roller means comprising at least one roller adapted to rotatably engage and exert lateral forces on said linkage segment means and a vertical support roller means comprising at least one roller adapted to rotatably engage and exert vertical forces on said linkage segment means, said base means being attached to and removably supported by a support means which rests on a foundation means, said support means being hinged to permit the turn guide apparatus to removably support said apparatus at a height permitting engagement of said linkage segment means and turn guide apparatus, said turn guide apparatus being disposed at a predetermined angle, exerting lateral and vertical forces on said linkage segment means to deflect said linkage segment means through an angle up to about 90°, controlling the path of said linkage segment means, and disengaging said portion of said linkage segment means.

* * * * *